United States Patent [19]

Symmes et al.

[11] Patent Number: 4,579,619

[45] Date of Patent: Apr. 1, 1986

[54] TIRE RETREADING APPARATUS

[75] Inventors: Russell Symmes; Glenn Howard, both of Muncie, Ind.

[73] Assignee: Sym-Trac, Inc., Muncie, Ind.

[21] Appl. No.: 718,546

[22] Filed: Apr. 1, 1985

[51] Int. Cl.[4] .................. B29H 5/04; B29H 17/36
[52] U.S. Cl. ............................ 156/394.1; 156/96; 425/17
[58] Field of Search ............... 425/17, 19; 156/96, 156/394.1

[56] References Cited

U.S. PATENT DOCUMENTS

| | | | |
|---|---|---|---|
| 3,207,647 | 9/1965 | Schelkmann | 156/394 |
| 3,689,337 | 9/1972 | Schelkmann | 156/909 X |
| 3,730,801 | 5/1973 | Martin | 156/96 |
| 3,793,116 | 2/1974 | Schelkmann | 156/394 |
| 3,895,985 | 7/1975 | Schelkmann | 156/96 |
| 3,966,535 | 6/1976 | Abularach | 156/394 FM |
| 4,153,497 | 5/1979 | Budrioli | 156/394 FM |
| 4,274,897 | 6/1981 | Barefoot | 156/394 FM X |
| 4,299,647 | 11/1981 | De Haven | 425/17 X |
| 4,309,234 | 1/1982 | Witherspoon | 156/394.1 X |

OTHER PUBLICATIONS

*Tred-X It!*, Tred-X Corporation of Muncie, Indiana.
*Equipment for the Harrelson Supertread Process of "Cold Cap" Retreading with Pre-Cured Tread Rubber*, Harrelson Rubber Company of Asheboro, N.C.
*Bandag Introduces 3 Tough New Retreads to Cut Tire Costs for Light Trucks and RV's.*, Bandag, Incorporated of Muncatine, Iowa.
*Oliver Passenger Precure*, Oliver Rubber Company of Oakland, CA.
*The Vulcap Pre-Cure Retreading System*, Vulcan Equipment Company Ltd. of Toronto, Ontario, Canada.

*Primary Examiner*—J. Howard Flint, Jr.
*Attorney, Agent, or Firm*—Emch, Schaffer, Schaub & Porcello Co.

[57] ABSTRACT

A retreading curing ring is disclosed. The ring includes a body member which defines a circular platform. A plurality of clamps are mounted at circumferentially spaced locations on the body members. The clamps are movable between an open and a closed position. A tire retreading assembly including a tire carcass and new retread tread stock is positioned within a flexible bag or envelope. Guides center the tire with respect to the circular platform. The envelope is sandwiched between the upper surface of the circular platform of the curing ring and the sidewall of the tire. When the clamps are moved to the closed position, an air tight seal is formed.

6 Claims, 8 Drawing Figures

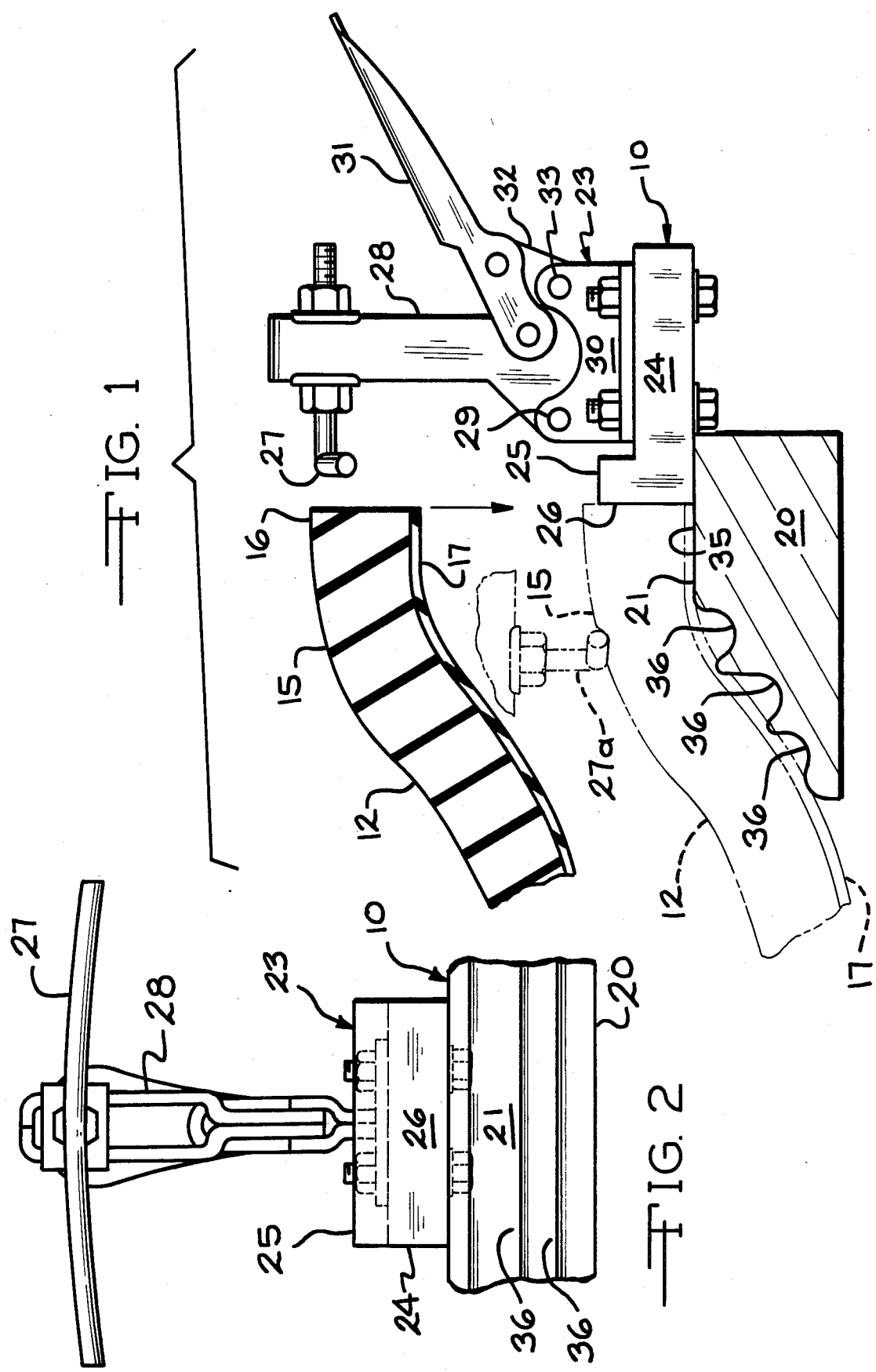

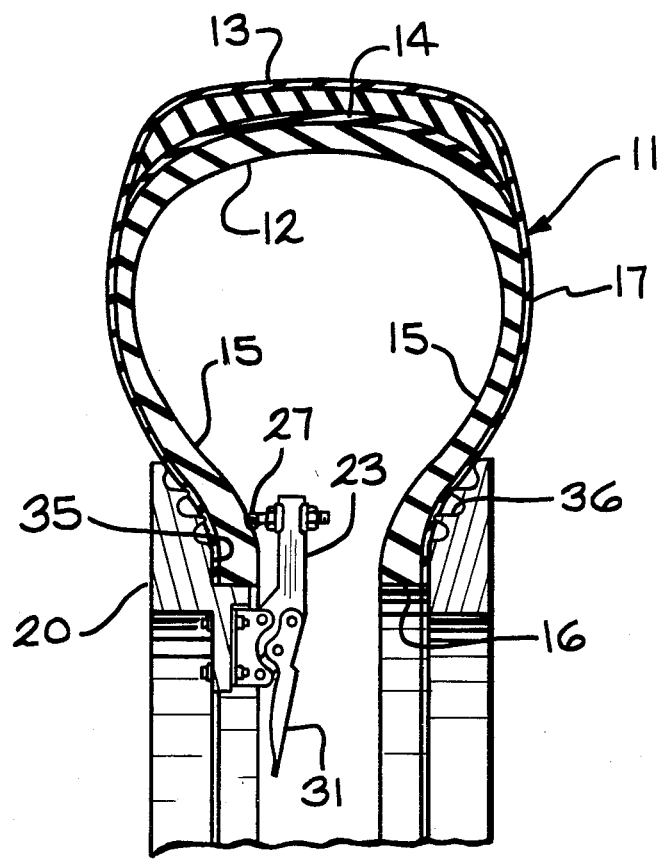
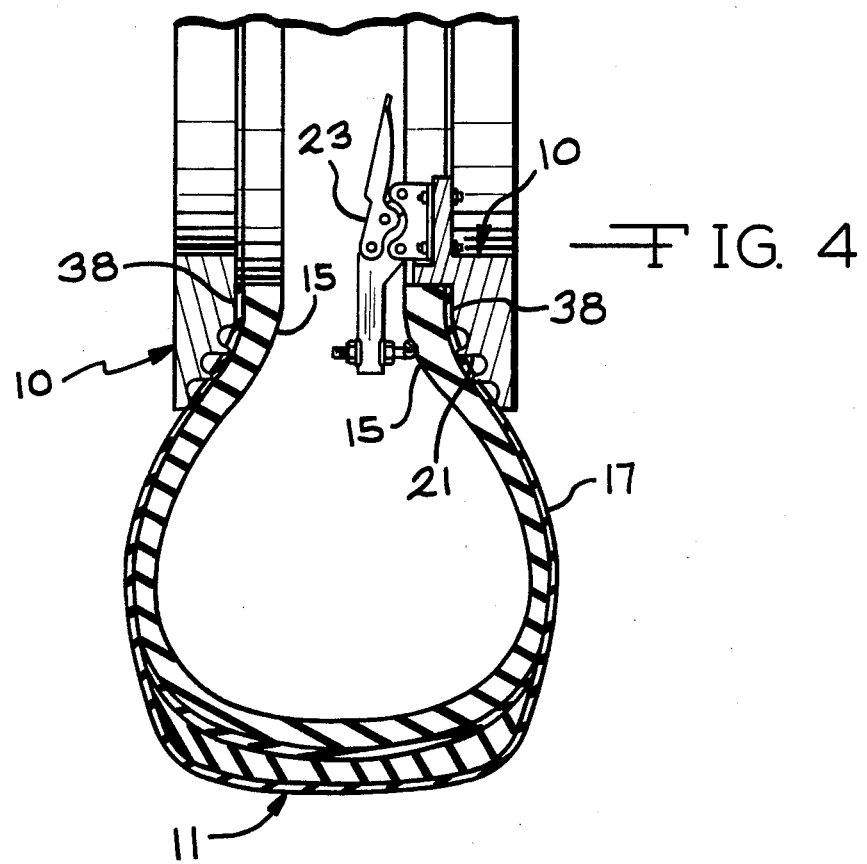
FIG. 4

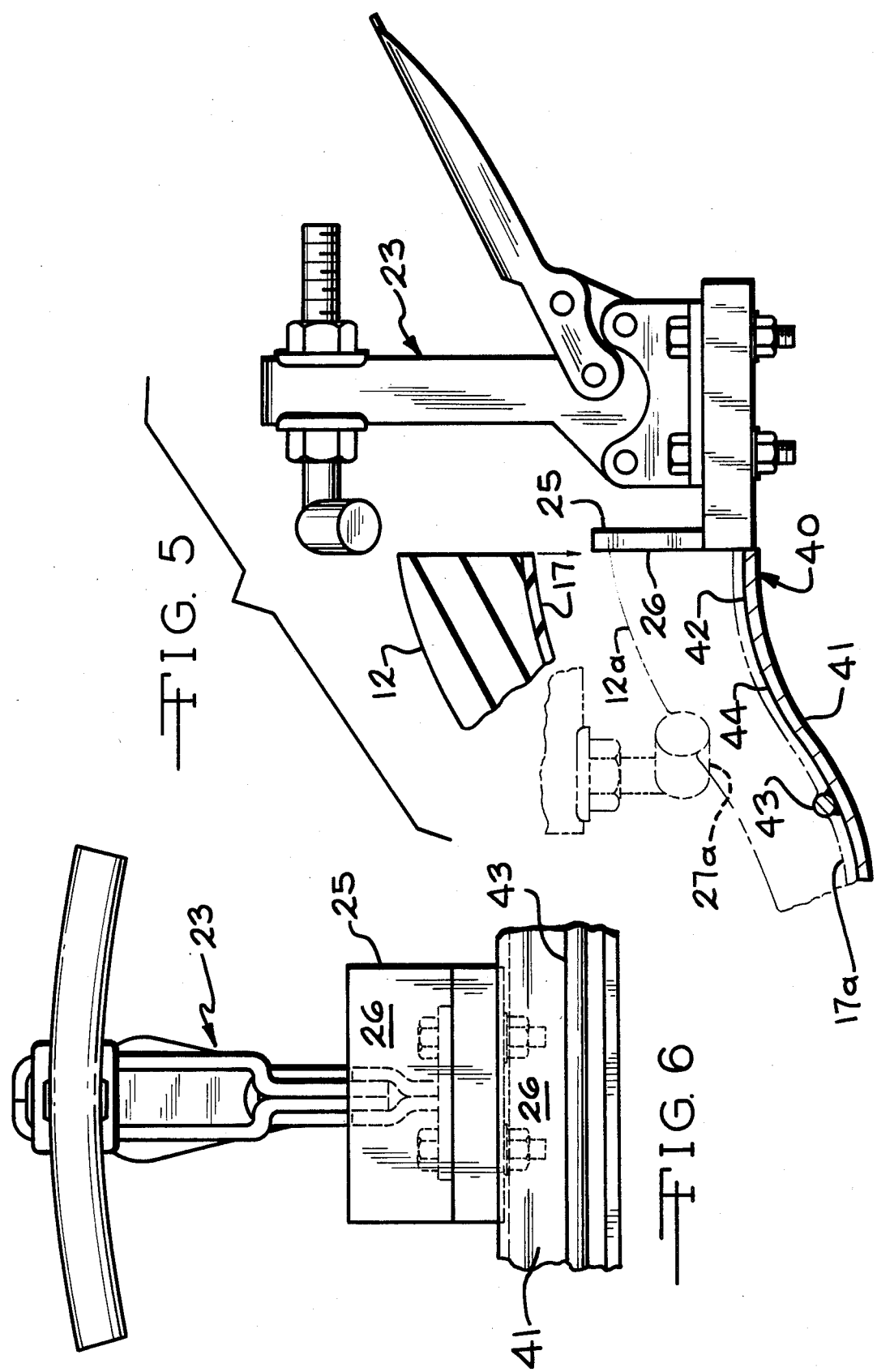

1

TIRE RETREADING APPARATUS

BACKGROUND OF THE INVENTION

In the retreading of tires, two methods are commonly used. In a tire mold method after preparation of the tire carcass, the carcass and uncured rubber are placed in a retreading mold. The mold shapes the uncured rubber into the desired tread pattern. The assembly is cured while in mold.

In the second method, to which the present apparatus is directed, a precured tread strip is applied to the prepared carcass together with an intermediate thin layer of uncured rubber. This assembly is then placed into a flexible elastomeric envelope which encases a portion of the carcass and the precured tread stock. Normally, the tire is mounted on a rim prior to enclosing the assembly with the flexible envelope. In addition to the rim, an inner tube is normally positioned within the tire carcass. Finally the entire assembly is positioned within an autoclave to cure the intermediate layer thus joining the precured tread to the tire carcass.

It has been found that the rim and tube acts as a thermal barrier and heat sink during the curing process and substantially lengthens the curing time. It is not unusual to have an eight hour curing cycle for a truck tire retreading operation.

SUMMARY OF THE INVENTION

The present invention is directed to a tire retreading curing ring apparatus which eliminates the necessity of mounting a tire assembly on a rim and using the inner tube during a Bandag type or other envelope type retreading method.

A retreading curing ring apparatus, according to the present invention, is positioned on each side of the tire assembly. Each ring is clamped to the tire forming a seal between the curing ring body, the inner edges of the flexible envelope and the tire sidewall.

It has been found that because the tire rim and inner tube is not necessary when using curing rings according to the present invention that the overall curing time can be significantly reduced. The curing time normally can be reduced by at least one third, thereby significantly increasing the rate of production in a tire retreading operation.

The retreading curing ring apparatus according to the present invention includes a circular body member which receives a portion of the flexible envelope adjacent the sidewall of the tire being retreaded. A plurality of clamps are mounted at circumferentially spaced locations on the body member. Guide surfaces ensure that the tire is centered. Each of the clamps includes a clamping arm which is movable between an open and a closed position. When the clamping arm is in a closed position, it holds the body member, the tire sidewall and the flexible envelope in an engaged or sealed position.

BRIEF DESCRIPTIONS OF THE DRAWINGS

FIG. 1 is an exploded cross-sectional view of a retreading curing ring apparatus, according to the present invention, and showing in dash lines the position of the flexible envelope, the tire sidewall bead and the clamping arm in the closed or engaged position;

FIG. 2 is a fragmentary elevational view of the curing ring apparatus shown in FIG. 1 and showing the clamping arm in an open position;

FIG. 4 is a fragmentary cross-sectional view taken along line 4—4 of FIG. 3 and shown on an enlarged scale;

FIG. 5 is a fragmentary cross-sectional view similar to FIG. 1 showing another embodiment of a retreading curing ring apparatus, according to the present invention;

FIG. 6 is a fragmentary elevational view similar to FIG. 2, showing the retreading curing ring embodiment of FIG. 5;

DESCRIPTION OF THE PREFERRED EMBODIMENTS

Figure 3:
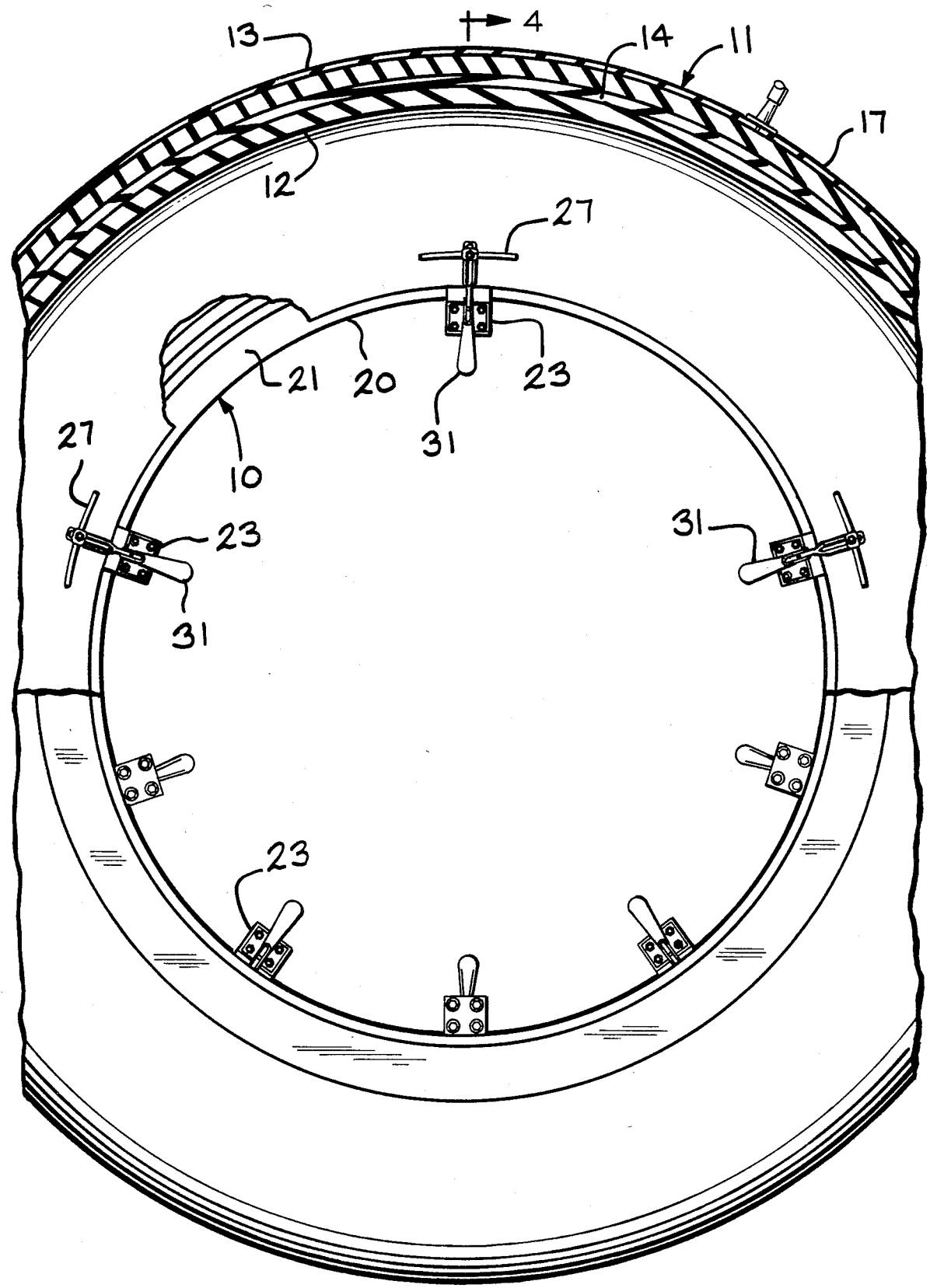
FIG. 3 is a fragmentary plan view of an entire tire retreading assembly having opposed retreading curing rings, according to the present invention positioned on both sides of the tire.

A retreading curing ring according to the present invention is generally indicated in the drawings by reference number 10. Referring to FIG. 4, a tire retreading assembly 11 is shown. The tire retreading assembly 11 includes a prepared tire carcass 12, a premolded tread strip 13 and an intermediate cushion gum layer 14. The tire carcass 12 has integral sidewalls 15 which extend downwardly and terminate at a circular bead 16. The tire retreading assembly 11 also includes an outer flexible elastomeric bag 17.

The curing ring apparatus 10 includes a circular body member 20 having an upper surface 21. A plurality of clamps 23 are mounted at circumferentially spaced locations on the body member 20. The clamp 23 includes a base member 24 having a guide projection 25 which defnes a vertical guide surface 26. Each clamp 23 also includes a clamping arm 27 which is movable between an open position and a closed position. The clamping arm 27 is adjustably mounted to a bifurcated support 28 which is pivotally attached by a pivot pin 29 to a base support 30. The base support 30 is mounted to the base member 24. A clamp handle 31 is pivotally connected to the support 28 and to a link 32. The link 32 is also pivotally mounted by a pivot pin 33 to the base support 30. Referring to FIG. 1, downward movement of the clamp handle 31 rotates the clamping arm 27 downwardly moving the clamping arm from the open position to the closed position indicated by the dash line representation 27a.

In the FIG. 1 embodiment, the circular body member 20 is normally cast from aluminum alloys. The upper surface 21 defines a circular recess or platform 35 adjacent the guide surfaces 26 of the clamps 23. In the FIG. 1 embodiment, the upper surface 21 of the circular body member 20 slopes angularly downwardly and includes a plurality of circular grooves or serrations 36. It is understood that the body member 20 may be constructed of differing materials and have varying shapes without departing from the present invention.

When using the curing rings 10, a curing ring is positioned on opposite sides of the tire carcass 12 as best shown in FIG. 4. The circular tire beads 16 are positioned against the guide surfaces 26 of the clamps 23 to ensure that the tire is centered relative to the curing rings 10. Inner edges 38 of the flexible bag or envelope 17 are sandwiched between the sidewalls 15 of the tire 12 and the upper surface 21 of the circular body members 20. As the clamping arms 27 move to the closed position, the tire 12 and the flexible envelope 17 are urged toward and into engagement with the upper surface 21 of the body member 20. In the FIG. 1 embodiment, the tire 12 and the flexible bag 17 are urged toward the concentric serrations 36 when the clamping arms 27 are moved toward the closed positions shown by dash lines 27a in FIG. 1 and also in FIG. 4. When the clamping arms 27 are completely closed a circular seal is formed and the assembly can be placed in an autoclave for curing.

Figure 7:
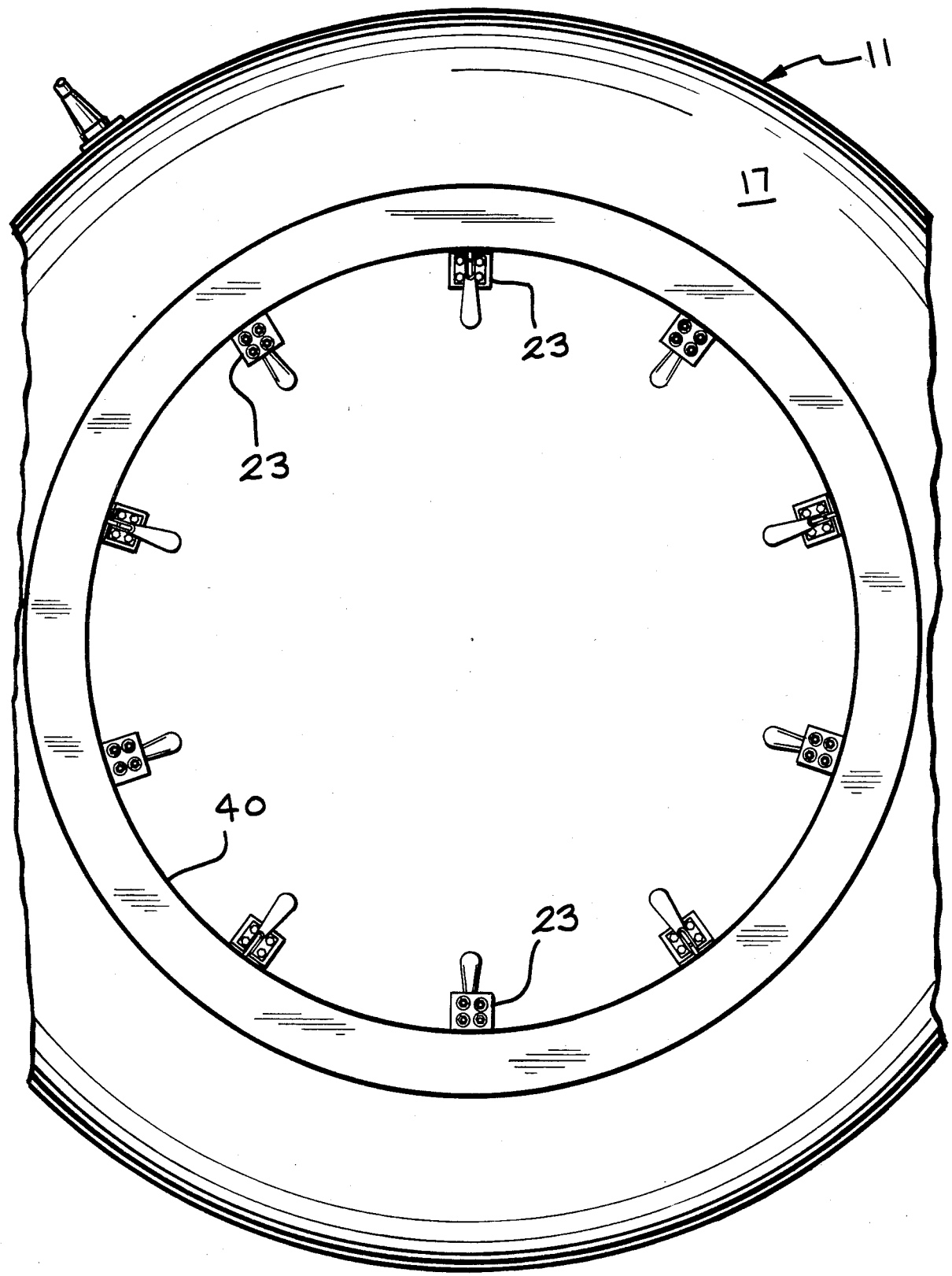
FIG. 7 is a fragmentary plan view of an entire retreading curing ring apparatus showing the FIG. 5 embodiment.

Another embodiment of the invention is shown in FIGS. 5–7. The clamps 23 are of the same construction. However, curing ring appratus 40 has a metal, for example a stamped steel or a relatively thin aluminium alloy circular body member 41. The circular body member 41 defines a circular platform 42 adjacent the vertical guide surface 26 of the guide projections 25. A circular bead 43 is mounted on an upper surface 44 of the body member 41 in spaced relationship to the guide surfaces 26 and at a location in opposed relationship to the clamping arm 27 when the arm is in the closed position 27a. Normally the circular bead 43 comprises a circular metal wire member. When the tire 12 and flexible envelope 17 are positioned on the upper surface 44 of the body member 41 as indicated by the reference numbers 12a and 17a in FIG. 5, the circular bead 43 ensures that an air tight seal is formed prior to insertion of the assembly into a pressure and heat vessel, such as an autoclave.

Figure 8:
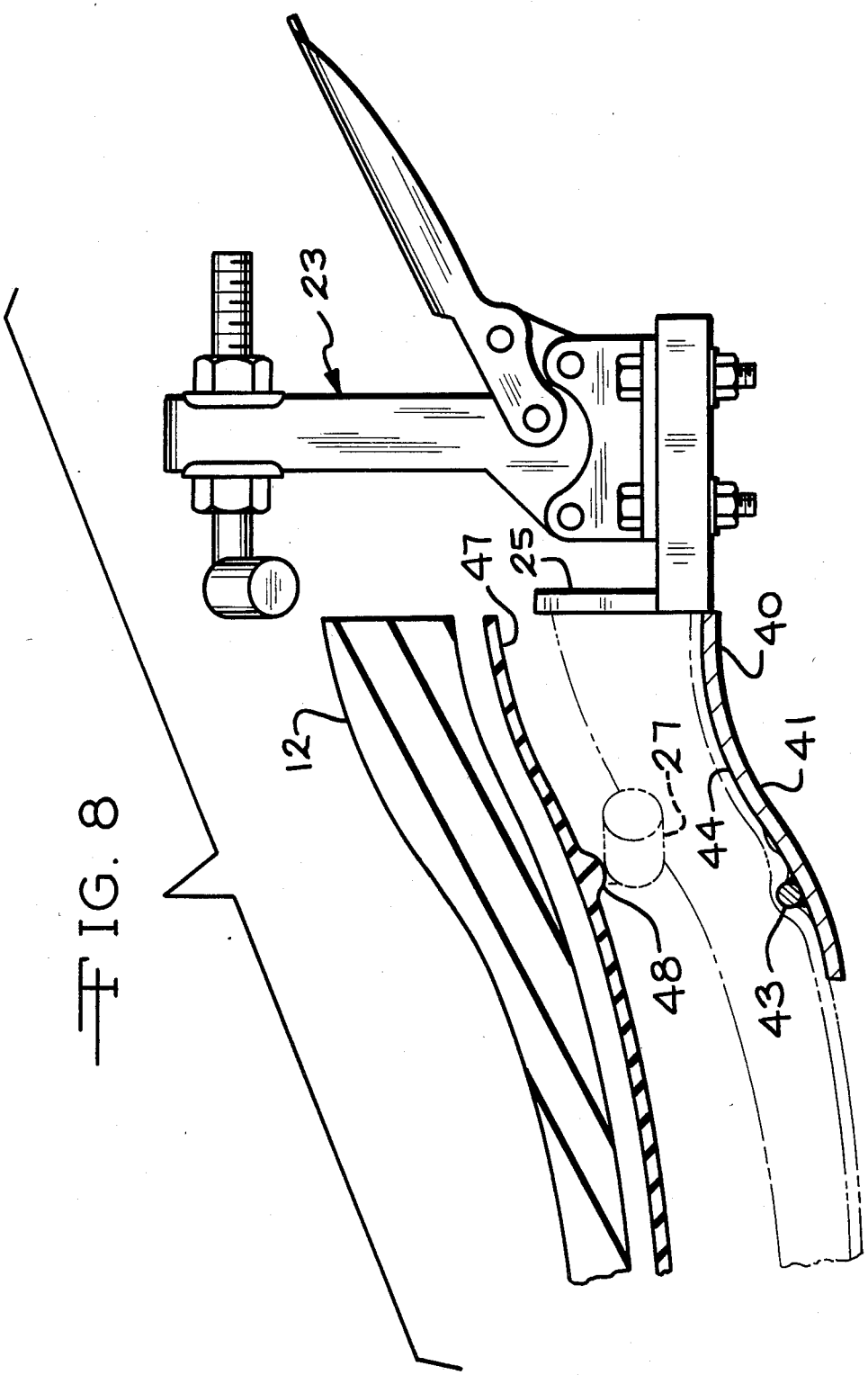
FIG. 8 is a fragmentary exploded view of still another embodiment of an overall tire retreading assembly and curing ring apparatus.

Still another embodiment of the present invention is shown in FIG. 8. In this embodiment a rubber-like flexible bag or envelope 47 includes an integrally molded and raised circular projection 48. The projection 48 has the configuration of a semi-"O"-ring. Upon positioning of the tire 12 and the envelope 47 upon the upper surface 44 of the curing ring 40, the projection 48 mates with the circular bead 43. As the clamping arms 27 move to the closed positions, the cooperation and compressing of the tire 12, flexible bag 47, projection 48, metal bead 43 and body member 41 ensure that the desired air tight seal is formed.

Many changes and revisions may be made to the specific structure of the curing ring apparatus disclosed herein without departing from the scope of the following claims.

What we claim is:

1. A retreading curing ring apparatus for mounting on a tire retreading assembly, such tire retreading assembly including a tire carcass defining a retread area and integral sidewalls having inner circular beads adjacent their free ends, a preformed tread strip positioned on said tread area and a flexible envelope surrounding such tread strip and said sidewalls and extending dowardly toward said circular bead, the retreading curing ring apparatus being positionable adjacent one of said sidewalls for securing such envelope to such tire for curing, said curing ring apparatus including a circular body member for receiving a portion of the envelope and the circular tire bead, guide means adjacent said circular body member for concentric aligning said tire carcass relative to said circular body member, and a plurality of clamps mounted at circumferentially spaced locations on said body member, each of said clamps including a clamping arm movable between an open and a closed position, whereby when said clamping arm is in the closed position it holds said body member, the tire sidewall and the envelope in an engaged position.

2. A retreading curing ring apparatus, according to claim 1, wherein said circular body member defines a circular platform for receiving the evelope and the circular bead.

3. A retreading curing ring apparatus, according to claim 1, wherein each of said clamps includes a base member mounted on said body member, said guide means comprising a guide surface on said base member.

4. A retreading curing ring apparatus, according to claim 2, wherein said circular body member defines a sloped surface including a plurality of concentric serrations, whereby the tire and the envelope is urged toward said concentric serrations when said clamping arms are moved toward such closed positions.

5. A retreading curing ring apparatus, according to claim 1, wherein said circular body member has a metallic circular bead on its upper surface.

6. A retreading curing ring apparatus, according to claim 5, wherein the envelope includes a raised circular projection adjacent its inner peripheries, said raised circular projection co-operting with said metallic circular bead on said body member when said clamps are moved to such closed position.

* * * * *